(12) United States Patent
VanderMeer

(10) Patent No.: US 9,957,881 B2
(45) Date of Patent: May 1, 2018

(54) CHARGE AIR COOLING SYSTEM AND CHARGE AIR COOLER FOR THE SAME

(71) Applicant: DENSO International America, Inc., Southfield, MI (US)

(72) Inventor: John VanderMeer, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 929 days.

(21) Appl. No.: 14/452,815

(22) Filed: Aug. 6, 2014

(65) Prior Publication Data

US 2016/0040586 A1 Feb. 11, 2016

(51) Int. Cl.
 *F02B 29/04* (2006.01)
 *F16H 57/04* (2010.01)
 *F02D 41/06* (2006.01)

(52) U.S. Cl.
 CPC ...... *F02B 29/0443* (2013.01); *F02B 29/0462* (2013.01); *F02B 29/0493* (2013.01); *F16H 57/0413* (2013.01); *F16H 57/0416* (2013.01); *F16H 57/0417* (2013.01); *F01P 2060/02* (2013.01); *F02D 41/068* (2013.01); *Y02T 10/146* (2013.01)

(58) Field of Classification Search
 CPC .............. F02B 29/0443; F02B 29/0493; F02B 29/0462; F16H 57/0417; F16H 57/0416; F16H 57/0413; F01P 2060/02; Y02T 10/146; F02D 41/068
 USPC ........................................................ 123/560
 See application file for complete search history.

(56) References Cited

U.S. PATENT DOCUMENTS

| | | | |
|---|---|---|---|
| 4,708,095 A | 11/1987 | Luterek | |
| 5,394,854 A * | 3/1995 | Edmaier | F01P 7/165 123/542 |
| 6,167,703 B1 * | 1/2001 | Rumez | F02B 29/0418 60/599 |
| 6,688,292 B2 * | 2/2004 | Ruppel | F02B 29/0412 123/563 |
| 6,758,266 B1 | 7/2004 | Sjunnesson et al. | |
| 7,806,091 B2 * | 10/2010 | Esau | F02B 29/0412 123/41.29 |
| 8,186,424 B2 * | 5/2012 | Kardos | F02B 29/0418 123/563 |
| 8,661,815 B2 | 3/2014 | Ulrey et al. | |
| 9,512,776 B2 * | 12/2016 | Eilemann | F02B 29/0412 |
| 9,605,587 B2 * | 3/2017 | Cunningham | F02B 29/0493 |

(Continued)

FOREIGN PATENT DOCUMENTS

| | | | | |
|---|---|---|---|---|
| EP | 2037200 A2 * | 3/2009 | ........... | F28D 1/0435 |
| EP | 2039906 A1 * | 3/2009 | ........... | F02B 29/0418 |

(Continued)

*Primary Examiner* — Jason T Newton

(57) ABSTRACT

A charge air cooler cools charge air compressed with a compressor. The charge air cooler includes a shell and an inner tube, which is accommodated in the shell and exposed to an interior of the shell. The shell has an inlet and an inlet to enable charge air to flow through the inlet, the interior of the shell, and the inlet and to pass around the inner tube in the shell. The inner tube is configured to draw working fluid from a transmission device of the vehicle or an engine and to conduct heat exchange between charge air, which flows through the interior of the shell, and working fluid to warm working fluid.

9 Claims, 9 Drawing Sheets

(56) References Cited

U.S. PATENT DOCUMENTS

| | | | |
|---|---|---|---|
| 2008/0022676 A1* | 1/2008 | Cook | F02B 29/0475 |
| | | | 60/599 |
| 2011/0088663 A1* | 4/2011 | Dehnen | F02B 29/0462 |
| | | | 123/542 |
| 2012/0006622 A1 | 1/2012 | Will | |
| 2014/0318508 A1* | 10/2014 | Banker | F02M 31/042 |
| | | | 123/556 |
| 2016/0356249 A1* | 12/2016 | Morey | B60K 13/02 |

FOREIGN PATENT DOCUMENTS

| | | | | | |
|---|---|---|---|---|---|
| GB | 2483271 A | * | 3/2012 | | F01M 5/002 |
| KR | 20040039736 A | * | 5/2004 | | F16H 57/04 |

* cited by examiner

CHARGE AIR COOLING SYSTEM AND CHARGE AIR COOLER FOR THE SAME

TECHNICAL FIELD

The present disclosure relates to a charge air cooling system for a vehicle. The present disclosure further relates to a charge air cooler for the charge air cooling system.

BACKGROUND

A known vehicle may be equipped with a transmission device coupled with a crankshaft of an engine to transmit output power of the engine. Such a transmission device, in general, includes a gear mechanism to reduce rotation speed of the crankshaft at a predetermined gear ratio and to manipulate output torque of the transmission. The transmission device contains working fluid such as lubricant fluid and/or torque converter fluid. For example, in a cold climate, such working fluid in the transmission device may be cold and may have high viscosity. It may be desirable to warm up working fluid in the transmission device quickly to reduce viscosity of working fluid immediately after ignition of an engine of a vehicle. In addition, it may be also desirable to warm up working fluid in the engine quickly immediately after ignition of the engine.

SUMMARY

The present disclosure addresses the above-described concerns.

According to an aspect of the preset disclosure, a charge air cooler is for cooling charge air, which is compressed with a compressor. The charge air cooler comprises a shell. The charge air cooling system further comprises an inner tube accommodated in the shell and exposed to an interior of the shell. The shell has an inlet and an outlet to enable charge air to flow through the inlet, the interior of the shell, and the outlet and to pass around the inner tube in the shell. The inner tube is configured to draw working fluid from a transmission device of the vehicle or working fluid from an engine and to conduct heat exchange between charge air, which flows through the interior of the shell, and working fluid.

According to another aspect of the preset disclosure, a charge air cooling system is for an engine of a vehicle. The charge air cooling system comprises a compressor to compress intake air to produce charge air. The charge air cooling system further comprises a charge air cooler configured to receive charge air from the compressor. The charge air cooling system further comprises a transmission device for manipulating output power of the engine. In a starting state after ignition of the engine, the charge air cooler is configured to receive working fluid from the transmission device or working fluid from the engine and to conduct heat exchange between charge air and working fluid to cool charge air and to warm working fluid.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
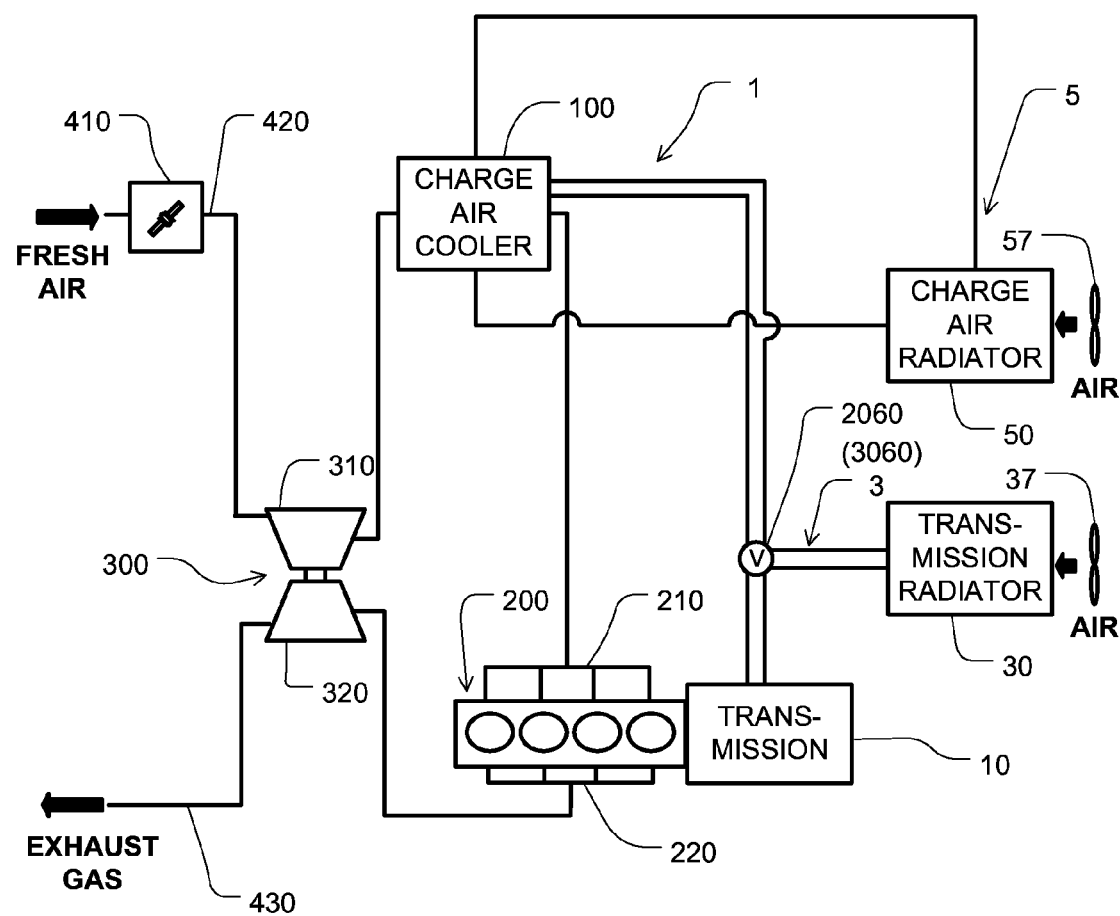
FIG. 1 is a block diagram showing a power train system for a vehicle, according to a first embodiment.

As follows, a first embodiment of the present disclosure will be described with reference to FIGS. 1 to 4. As shown FIG. 1, an internal combustion engine 200 has at least one cylinder connected with an intake manifold 210 and an exhaust manifold 220. In the present example, the engine 200 is a direct injection engine having four cylinders. The engine 200 is combined with an intake and exhaust system including an intake valve 410, an intake passage 420, a turbocharger 300, and an exhaust passage 430. The intake valve 410 is equipped in the intake passage 420. The turbocharger 300 includes a compressor 310 and a turbine 320, which are rotatably connected with each other concentrically via a common axis. The engine 200 is connected with the intake passage 420 via the charge air cooler 100 and the compressor 310. The engine 200 is further connected with the exhaust passage 430 via the exhaust manifold 220 and the turbine 320.

The intake passage 420 conducts intake air through the intake valve 410 into the compressor 310. The intake valve 410 is equipped in the intake passage 420 to regulate a quantity of intake air flowing into the compressor 310. The compressor 310 pressurizes the intake air. The charge air cooler 100 functions as an intercooler to cool the compressed intake air. The engine 200 draws the cooled intake air. The engine 200 includes an injector (not shown) to inject fuel into each cylinder to form air-fuel mixture with intake air. The air-fuel mixture is burned in the cylinder to drive a piston in the cylinder. The engine 200 emits exhaust gas through the exhaust manifold 220 and the turbine 320 to the exhaust passage 430. The turbine 320 is driven by the exhaust gas emitted from the engine 200 to rotate the compressor 310 thereby to cause the compressor 310 to compress intake air and to press-feed the compressed intake air through the charge air cooler 100 into the engine 200.

The engine 200 is equipped with a transmission device 10. More specifically, a crankshaft of the engine 200 may be coupled with an input shaft of the transmission device 10. The transmission device 10 may be an automatic transmission device or a manual transmission device. More specifically, the automatic transmission device may be a torque-converter transmission device or a CVT transmission device. The transmission device 10 may employ various configurations other than the presently exemplified configurations. The transmission device 10 may include various gear mechanisms such as a planetary gear mechanism for adjusting, for example, a reduction ratio and a rotation speed of an output shaft, and/or for adjusting, for example, a torque of the output shaft. The transmission device 10 contains working fluid. The working fluid may be, for example, lubricant, torque converter fluid, and/or thermal medium (warming and/or cooling medium).

The transmission device 10 is connected with the charge air cooler 100, a first radiator (transmission radiator) 30, and circulation passages 1 and 3, which are connected with each other via a valve 60.

The first radiator 30 may have a fin and tube configuration to conduct heat exchange between working fluid, which flows through a fluidic passage inside the first radiator 30, with air, which passes through air passages formed among fins and tubes of the first radiator 30. The first radiator 30 may be equipped with a first fan 37 to cause airflow through the air passages thereby to enhance efficiency of heat exchange.

The charge air cooler 100 is connected with a second radiator (charge air radiator) 50 and a circulation passage 5. The second radiator 50 may have a fin and tube configuration to conduct heat exchange between working fluid, which flows through a fluidic passage inside the second radiator 50, with air, which passes through air passages formed among fins and tubes of the second radiator 50. The second radiator 50 may be equipped with a second fan 57 to cause airflow through the air passages thereby to enhance efficiency of heat exchange. The working fluid of the second radiator 50 may be coolant such as cooling water containing anti-freezing solution.

When the compressor 310 pressurizes intake air, the compressor 310 substantially causes adiabatic compression in the intake air to increase pressure and temperature of the intake air. The charge air cooler 100 conducts heat exchange with working fluid to cool the pressurized intake air. In this way, the charge air cooler 100 increases intake air mass per unit volume to enable to increase a quantity of fuel to be burned with the cooled intake air as mixture. Thus, the charge air cooler 100 enhances combustion efficiency of mixture of intake air and fuel in the combustion chamber of the engine 200.

It is noted that, the engine 200 discharges exhaust gas immediately after the engine 200 is started to rotate the turbine 320 and thereby to drive the compressor 310. When the engine 200 is in a starting state immediately after ignition of the engine 200, the compressor 310 enables to start adiabatic compression instantly in intake air to pressurize the intake air and to increase temperature of the intake air. That is, the charge air cooler 100 draws high-temperature intake air immediately after starting of the engine 200, even in the state where exhaust gas is not necessarily at high temperature.

Figure 2:
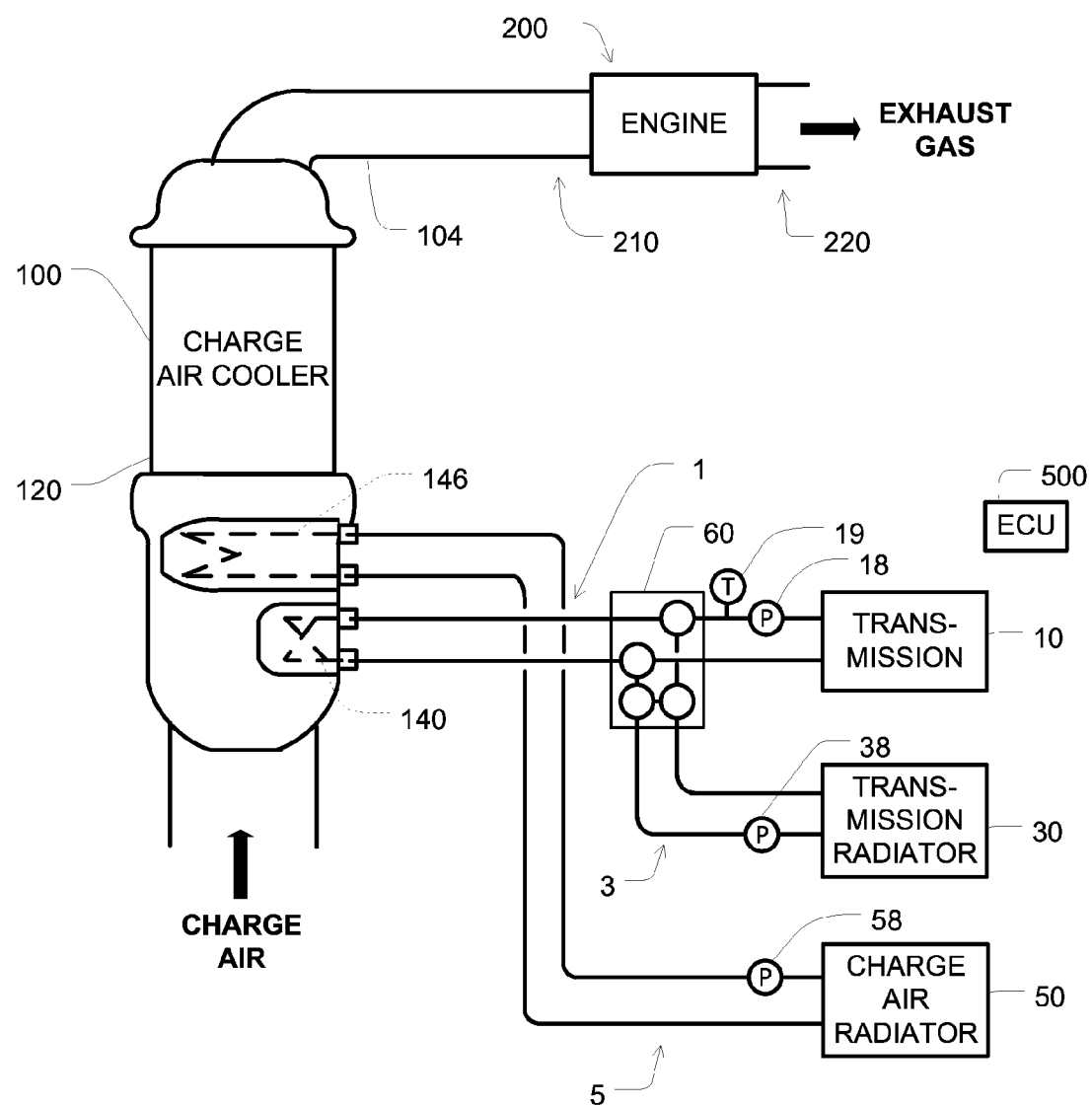
FIG. 2 is a block diagram showing a charge air cooler for an engine of the vehicle and showing fluidic connections among the charge air cooler, a transmission device, and radiators, according to the first embodiment.

As shown in FIG. 2, the charge air cooler 100 may have a shell and tube configuration. Specifically, the charge air cooler 100 includes an inner tube 140, an inner tube 146, and a shell 120. The shell 120 includes a tubular body and end caps to form a hollow cavity accommodating the inner tube 140 and the inner tube 146. The inner tube 146 is located at the downstream side of the inner tube 140 relative to the flow of charge air.

The inner tubes 140 and 146 may employ various forms such as a coil form, a U-shape form, and/or the like. The inner tubes 140 and 146 may be equipped with fins for conducting heat effectively with intake air. The shell 120 is communicated with an inlet 102 and an inlet 104 to enable charge air, which is pressurized by the compressor 310, therethrough and to conduct heat exchange between the charge air and working fluid flowing through the inner tubes 140 and 146. The inner tubes 140 and 146 are exposed directly to the interior of the shell 120 to enable direct heat exchange with charge air.

The inner tube 140 is connected with the transmission device 10 through the circulation passage 1 and the valve 60. The circulation passage 1 is equipped with a first pump 18 to feed working fluid from the transmission device 10. The inner tube 140 is further connected with the first radiator 30 through a part of the circulation passage 1, the valve 60, and the circulation passage 3. The circulation passage 3 is equipped with a second pump 38 to feed working fluid from the first radiator 30.

The inner tube 146 is connected with the second radiator 50 through a circulation passage 5. The circulation passage 5 is equipped with a third pump 58 to feed working fluid from the second radiator 50 to the inner tube 146. The third pump 58 may regularly circulate working fluid between the second radiator 50 and the inner tube 146.

The circulation passage 1 is equipped with a temperature sensor 19 for detecting temperature of working fluid flowing from the transmission device 10. The temperature sensor 19 is electrically communicated with an ECU (electronic control unit) 500 to send detection signal to the ECU 500.

In the present example, the valve 60 is a six-way valve. Further, in the present example, the valve 60 includes four three-way valve elements as shown by circles in FIG. 2. Each of the valve elements includes one inlet and two outlets. The valve element is configured to switch inner passage to communicate the one inlet with one of the two outlets. The valve 60 is configured to switch circulation of working fluid among the transmission device 10, the charge air cooler 100, and the first radiator 30. The valve 60 may have a solenoid actuator, which is electrically connected with the ECU 500 and configured to be manipulated with the ECU 500. The valve elements of the valve 60 may be formed between a tubular body and a shaft, which is movable in the tubular body, to switch communication between passages formed between lands of the shaft and holes and cavities of the tubular body.

Figure 3:
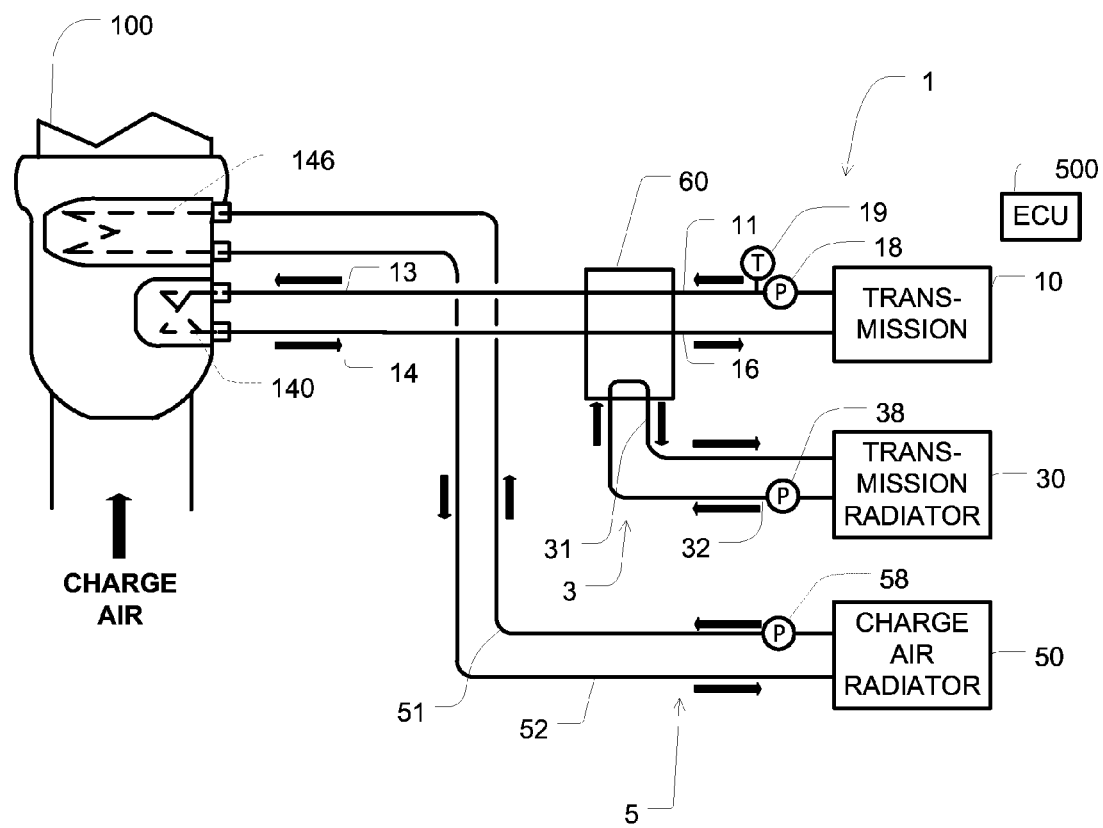
FIG. 3 is a block diagram showing fluidic connections among the charge air cooler, the transmission device, and the radiators in a starting state, according to the first embodiment.

As shown in FIG. 3, the circulation passage 1 includes passages 11, 13, 14, 16. The passage 11 and the passage 16 connect the transmission device 10 with the valve 60. The passage 13 and the passage 14 connect the valve 60 with the charge air cooler 100. The circulation passage 3 includes passages 31 and 32, which connect the valve 60 with the first radiator 30. The circulation passage 5 includes passages 51 and 52, which connect the charge air cooler 146 with the second radiator 50.

(Starting State)

Subsequently, operation of the power train system when the engine 200 is in a starting state immediately after ignition of the engine 200 will be described.

As shown in FIG. 3, in the starting state, the valve 60 is manipulated to form passages to communicate between the transmission device 10 and the charge air cooler 100. Specifically, the transmission device 10 is communicated with the charge air cooler 100 through a circulation passage formed by the passage 11, the valve 60, and the passage 13. In addition, the charge air cooler 100 is communicated with the transmission device 10 through a circulation passage formed by the passage 14, the valve 60, and the passage 16. Thus, the first pump 18 circulates working fluid between the transmission device 10 and the inner tube 140 through the passages (circulation passage 1), and the valve 60. In this way, in the starting state, the charge air cooler 100 conducts heat exchange between working fluid flowing from the transmission device 10 and charge air flowing though the charge air cooler 100. Therefore, working fluid of the transmission device 10 is enabled to be warmed up quickly immediately after ignition of the engine. In general, working fluid of the transmission device 10 has high viscosity under a cold state. Therefore, the present configuration may be effective to reduce viscosity of working fluid of the transmission device 10 instantly thereby to facilitate smooth operation of the transmission device 10 quickly.

In the starting state, the valve 60 communicates the passage 31 with the passage 32. The second pump 38 circulates working fluid flowing from the first radiator 30 through the passage 31, the valve 60, and the passage 32. In the present state, the second pump 38 may circulate working fluid between the first radiator 30 with an auxiliary thermal source (not shown) to conduct heat exchange between the auxiliary thermal source and air passing through the first radiator 30 thereby to cool the auxiliary thermal source.

In addition, the third pump 58 circulates working fluid flowing between the second radiator 50 and the inner tube 146 through the passage 51 and the passage 52. In the present state, the third pump 58 may circulate working fluid between the second radiator 50 with another auxiliary thermal source (not shown) to conduct heat exchange between the other auxiliary thermal source and air passing through the second radiator 50 thereby to cool the auxiliary thermal source.

(Normal State)

When a sufficient time elapses after ignition of the engine 200, working fluid in the transmission device 10 is sufficiently warmed with charge air flowing through the charge air cooler 100. Thus, transition is made from the starting state into a normal state. In the normal state, it is deemed that working fluid of the transmission device 10 need not be warmed up any longer.

It is noted that, as the transmission device 10 operates, working fluid in the transmission device 10 generates heat itself due to, for example, sharing deformation of working fluid with high viscosity and mechanical friction of inner components such as gears. Therefore, in the normal state, working fluid of the transmission device 10 needs cooling down.

Figure 4:
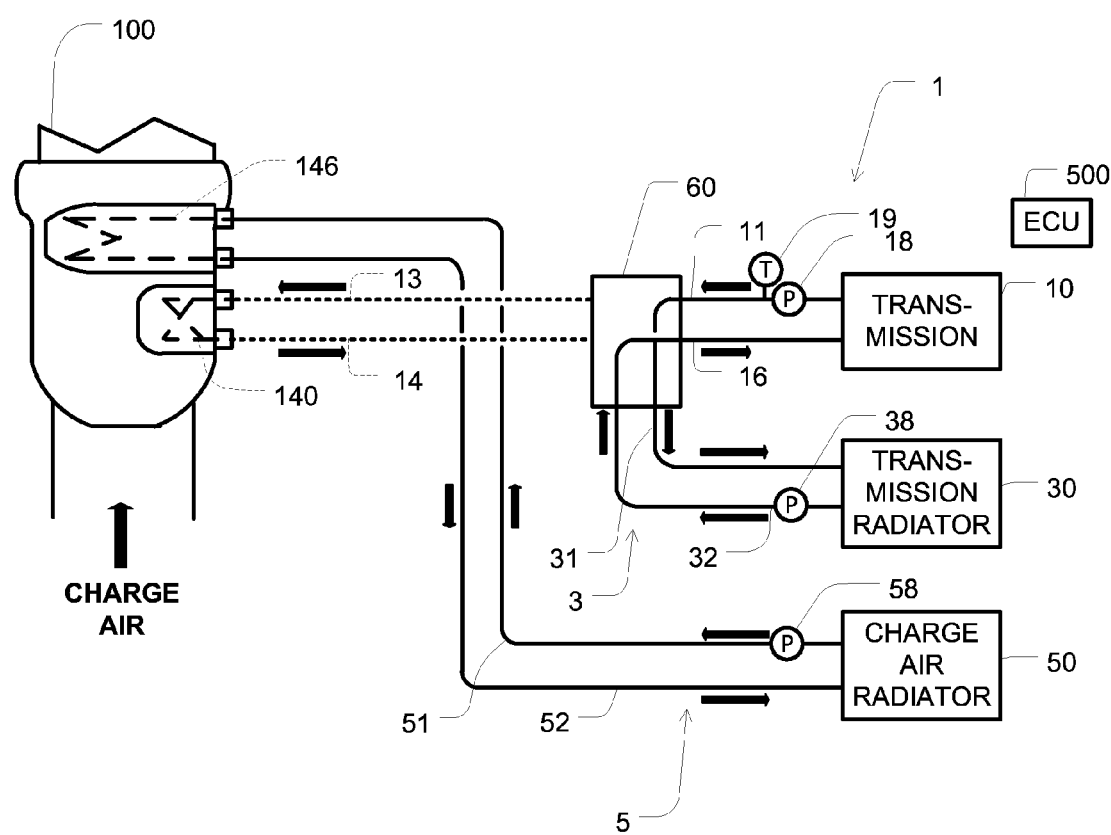
FIG. 4 is a block diagram showing fluidic connections among the charge air cooler, the transmission device, and the radiators in a normal state, according to the first embodiment.
Figure 5:
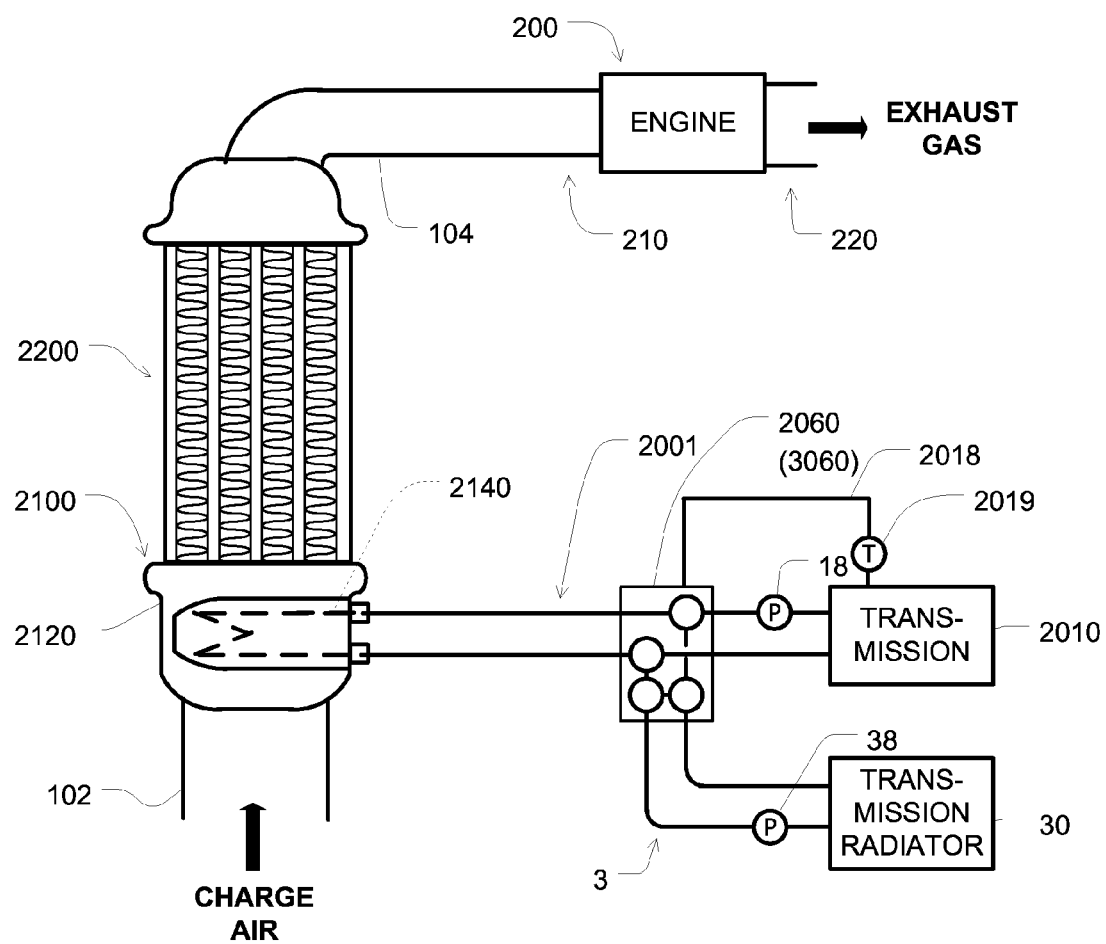
FIG. 5 is a block diagram showing a charge air cooler and fluidic connections among the charge air cooler, a transmission device, and the radiator, according to a second embodiment.

In consideration of the condition, as shown in FIG. 4, in the normal state, the valve 60 is manipulated to form passages to communicate between the transmission device 10 and the first radiator 30.

Specifically, the transmission device 10 is communicated with the first radiator 30 through a circulation passage formed by the passage 11, the valve 60, and the passage 31. In addition, the first radiator 30 is communicated with the transmission device 10 through a circulation passage formed by the passage 32, the valve 60, and the passage 16.

As same as the starting state, the inner tube 146 of the charge air cooler 100 is regularly communicated with the second radiator 50 through the circulation passage formed by the passage 51 and the passage 52.

Thus, the first pump 18 and the second pump 38 circulate working fluid between the transmission device 10 and the first radiator 30 through a part of the circulation passage 1, the valve 60, and the circulation passage 3. In this way, in the normal state, the first radiator 30 conducts heat exchange between working fluid of the transmission device 10 and air flowing though the first radiator 30. Therefore, working fluid of the transmission device 10 is enabled to be cooled down in the normal state.

In addition, the third pump 58 circulates working fluid between the inner tube 146 of the charge air cooler 100 and the second radiator 50 through the circulation passage 5. In this way, in the normal state, the second radiator 50 conducts heat exchange between working fluid of the inner tube 146 and air flowing though the second radiator 50. Therefore, working fluid of the inner tube 146 is enabled to be cooled down in the normal state.

The ECU 500 may function as a controller to make determination of the transition from the starting state to the normal state based on, for example, the detection signal of the temperature sensor 19, elapsed time after ignition of the engine 200 in the starting state, and/or the like.

When a predetermined time elapses after stoppage of the engine 200, the ECU 500 may manipulate the valve 60 to recover the passages in the normal state to the passages in the starting state. The ECU 500 may function as the controller to make determination to recover the passages based on, for example, the detection signal of the temperature sensor 19, elapsed time after stoppage of the engine 200, and/or the like.

As described above, the present configuration enables to warm working fluid in the transmission device 10 with the charge air cooler 100, even immediately after starting of the engine 200 in which temperature of exhaust gas may be deemed to be low and/or unstable. In this way, the present configuration may provide effective thermal source, which is heated immediately after ignition of the engine 200 and is desirably cooled instantly. Thus, the present configuration may enable smooth start up of the transmission device 10 and the engine 200.

In addition, the inner tube 140 is exposed to the interior the charge air cooler 100, thereby to enable direct heat exchange between working fluid and charge air. The present configuration may further facilitate heat exchange between working fluid with charge air.

Second Embodiment

Figure 6:
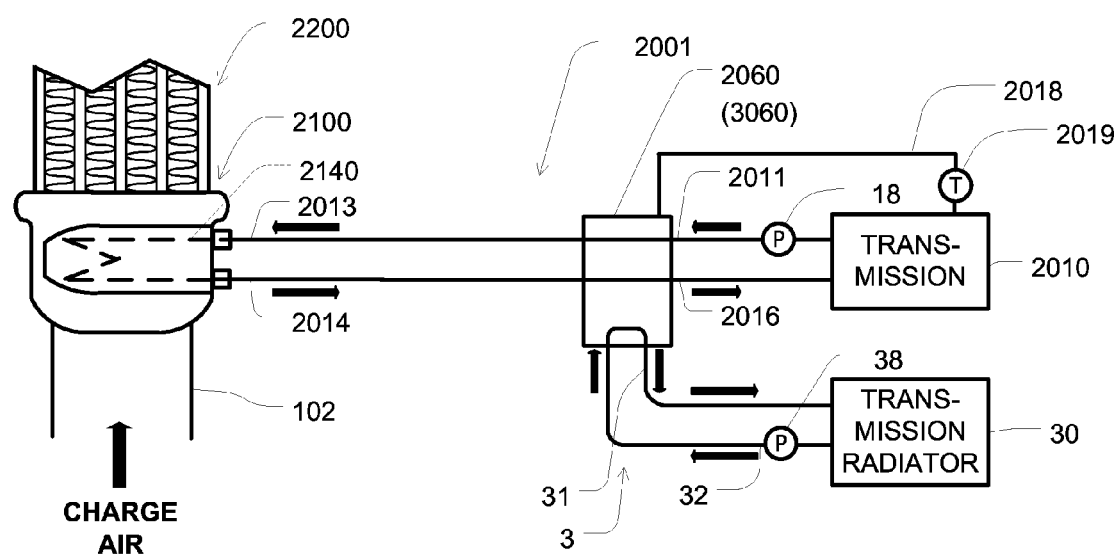
FIG. 6 is a block diagram showing fluidic connections among the charge air cooler, the transmission device, and the radiator in the starting state, according to the second embodiment.

The second embodiment will be described with reference to FIGS. 6 to 8. As shown in FIG. 6, a charge air cooler 2100 according to the second embodiment includes a shell 2120 and an inner tube 2140. The inner tube 2140 is directly exposed to the interior of the shell 2120. The shell 2120 has a hollow cavity accommodating the inner tube 2140. The inner tube 2140 may employ various forms.

The charge air cooler 2100 is equipped with a downstream cooler 2200. The downstream cooler 2200 employs a fin and tube configuration including multiple fins and multiple tubes, which are stacked alternately to each other. The tubes form passages to pass charge air flowing from the charge air cooler 2100 toward the engine 200. The fins form passages to pass air therethrough to enhance heat exchange between charge air and air passing around the fins.

A transmission device 2010 is connected with the charge air cooler 2100, the first radiator (transmission radiator) 30, and circulation passages 2001 and 3, which are connected with each other via a valve 2060. In the present second embodiment, the second radiator (charge air radiator) 50 is omitted. The inner tube 2140 is connected with the transmission device 2010 through a circulation passage 2001 and the valve 2060. The circulation passage 2001 is equipped with the first pump 18 to feed working fluid from the transmission device 2010.

The transmission device 2010 is equipped with a temperature sensor 2019. in the second embodiment, the temperature sensor 2019 is for detecting temperature of working fluid flowing inside the transmission device 2010. The temperature sensor 2019 may be a thermostat device including a bimetal structure and/or thermal expansion/contraction structure. The temperature sensor 2019 is coupled with the valve 2060 via a fluidic and/or mechanical connection 2018. The temperature sensor 2019 is configured to manipulate the valve 2060 in a mechanical and/or fluidic manner according to temperature of working fluid. The valve 2060 is a six-way valve, similarly to the first embodiment.

As shown in FIG. 6, the circulation passage 2001 includes passages 2011, 2013, 2014, 2016. The passage 2011 and the passage 2016 connect the transmission device 2010 with the valve 2060. The passage 2013 and the passage 2014 connect the valve 2060 with the charge air cooler 2100. The circulation passage 3 includes passages 31 and 32, which connect the valve 2060 with the first radiator 30.

(Starting State)

As shown in FIG. 6, in the starting state, the valve 2060 is manipulated to form passages to communicate between the transmission device 2010 and the charge air cooler 2100. Specifically, the transmission device 2010 is communicated with the charge air cooler 2100 through a circulation passage formed by the passage 2011, the valve 2060, and the passage 2013. In addition, the charge air cooler 2100 is communicated with the transmission device 2010 through a circulation passage formed by the passage 2014, the valve 2060, and the passage 2016. Thus, the first pump 18 circulates working fluid between the transmission device 2010 and the inner tube 2140 through the passages (circulation passage 2001) and the valve 2060. In this way, in the starting state, the charge air cooler 2100 conducts heat exchange between working fluid and charge air. In the starting state, the valve 2060 communicates the passage 31 with the passage 32.

(Normal State)

Figure 7:
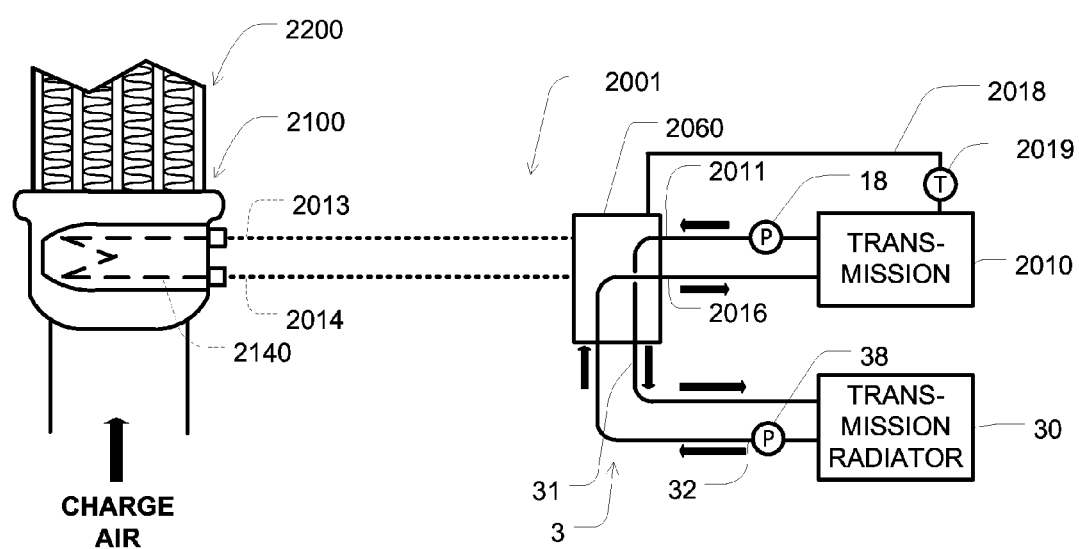
FIG. 7 is a block diagram showing fluidic connections among the charge air cooler, the transmission device, and the radiator in the normal state, according to the second embodiment.

As shown in FIG. 7, in the normal state, the valve 2060 is manipulated to form passages to communicate between the transmission device 2010 and the first radiator 30. Specifically, the transmission device 2010 is communicated with the first radiator 30 through a circulation passage formed by the passage 2011, the valve 2060, and the passage 31. In addition, the first radiator 30 is communicated with the transmission device 2010 through a circulation passage formed by the passage 32, the valve 2060, and the passage 2016. Thus, the first pump 18 and the second pump 38 circulate working fluid between the transmission device 2010 and the first radiator 30 through a part of the circulation passage 2001, the valve 2060, and the circulation passage 3.

When temperature of working fluid in the transmission device 2010 decreases sufficiently, the temperature sensor 2019 may manipulate the valve 2060 to recover the passages in the normal state to the passages in the starting state.

Third Embodiment

The third embodiment is substantially equivalent to the second embodiment excluding the configuration in the normal state. According to the third embodiment, transition is made from the stating state shown in FIG. 6 to the normal state shown in FIG. 8.

Figure 8:
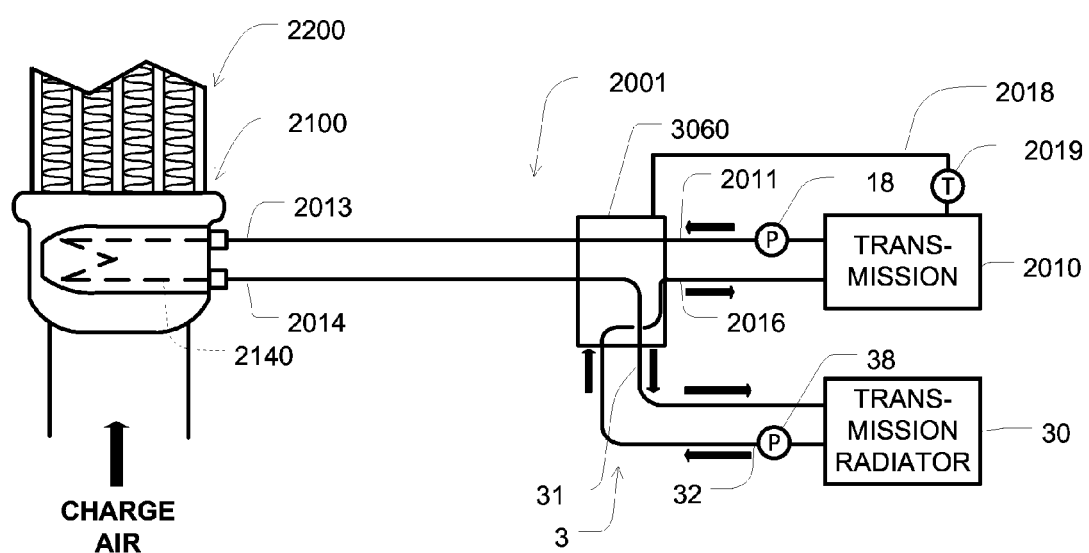
FIG. 8 is a block diagram showing fluidic connections among the charge air cooler, the engine, and the radiator, according to a third embodiment.

As shown in FIG. 8, a valve 3060 is manipulated to form passages to communicate among the transmission device 2010, the charge air cooler 2100, and the first radiator 30. Specifically, the transmission device 2010 is communicated with the charge air cooler 2100 through a circulation passage formed by the passage 2011, the valve 3060, and the passage 2013. The charge air cooler 2100 is communicated with the first radiator 30 through a circulation passage formed by the passage 2014, the valve 3060, and the passage 31. The first radiator 30 is communicated with the transmission device 2010 through a circulation passage formed by the passage 32, the valve 3060, and the passage 2016. Thus, the first pump 18 and the second pump 38 circulate working fluid among the transmission device 2010, the charge air cooler 2100, and the first radiator 30 through a part of the circulation passage 2001, the valve 3060, and the circulation passage 3.

Fourth Embodiment

Figure 9:
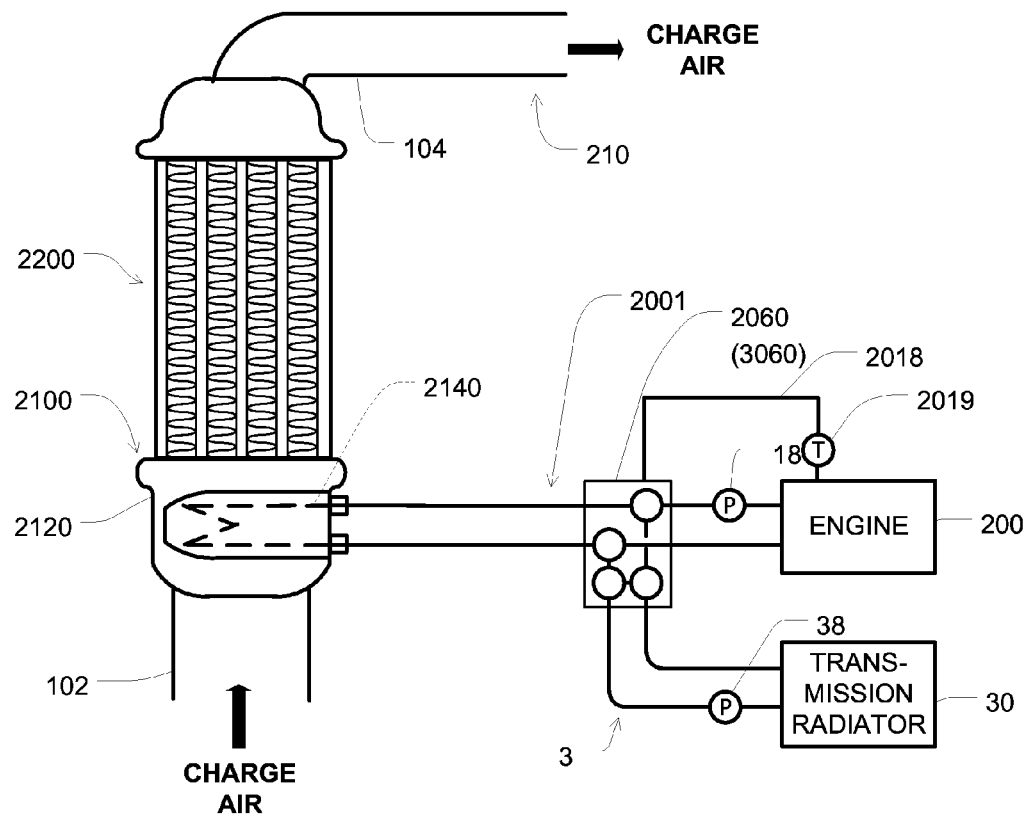
FIG. 9 is a block diagram showing fluidic connections among the charge air cooler, the engine, and the radiator, according to the fourth embodiment.

FIG. 9 shows a fourth embodiment of the present disclosure. The fourth embodiment is substantially equivalent to the second embodiment and the third embodiment excluding the configuration in which fluid connections of working fluid with the transmission device 2010 is replaced fluid connections of working fluid with the engine 200. The temperature sensor 2019 detects temperature of working fluid flowing inside the engine 200 or temperature of working fluid flowing through the circulation passage 2001. In addition, the temperature sensor 2019 manipulates the valve 2060 (3060) according to temperature of working fluid of the engine 200.

The present configuration enables to warm working fluid of the engine 200 in the stating state, thereby to quickly warm up the engine 200. When working fluid of the engine 200 is sufficiently warmed up, transition is made from the staring state in FIG. 9 into the normal mode in FIG. 7 or into the normal mode in FIG. 8.

Other Embodiment

The first embodiment may employ the valve 3060 in the third embodiment. That is, in the first embodiment, working fluid may be circulated among the transmission device 10, the inner tube 140 of the charge air cooler 100, and the transmission radiator 30 in the normal state.

The charge air cooler 2100 and the downstream cooler 2200 may be employed in the first embodiment. The charge air cooler 100 may be employed in the second to fourth embodiments.

The ECU 500 and the temperature sensor 19 may be employed in the second to fourth embodiments. The temperature sensor 2019 may be employed in the first embodiment.

The downstream cooler 2200 may be located at the upstream of the charge air cooler 2100.

The second pump 38 may be omitted. In this case, working fluid may not be circulated in the first radiator 30 in the starting state.

The charge air cooler 100 is not limited to employ a shell and tube configuration as exemplified above. The charge air cooler 100 may employ various configurations such as a fin and tube configuration and/or a plate and tube configuration.

The first and second valves 60 and 80 need not to have the above-exemplified configuration and may employ various configurations.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A charge air cooling system for an engine of a vehicle, the charge air cooling system comprising:
    a compressor to compress intake air to produce a charge air;
    a charge air cooler configured to receive the charge air from the compressor;
    a first radiator configured to receive air; and
    a transmission device for manipulating output power of the engine, wherein
    in a starting state after ignition of the engine, the charge air cooler is configured to receive a working fluid from at least one of the transmission device or the engine and to conduct heat exchange between the charge air and the working fluid to cool the charge air and to warm the working fluid,
    in a normal state subsequent to the starting state,
        the charge air cooler is configured not to receive working fluid from the transmission device or working fluid from the engine, and
        the first radiator is configured to receive working fluid from the transmission device or working fluid from the engine and to conduct heat exchange between working fluid and air to cool working fluid.

2. The charge air cooling system according to claim 1, further comprising: a second radiator configured to receive air, wherein the second radiator is configured to receive the working fluid from the charge air cooler and to conduct heat exchange between the working fluid and the charge air, and the charge air cooler is configured to receive the working fluid from the second radiator and to conduct heat exchange between the working fluid and the charge air.

3. The charge air cooling system according to claim 2, further comprising:
    a valve, wherein
    the valve is configured to form a passage to communicate the transmission device or the engine with the charge air cooler in the starting state, and
    the valve is configured to form the passage to communicate the transmission device or the engine with the first radiator and to communicate the charge air cooler with the second radiator in the normal state.

4. The charge air cooling system according to claim 3, further comprising: a temperature sensor configured to detect a temperature of the working fluid; and a controller configured to manipulate the valve, wherein the controller is configured to determine the starting state or the normal state according to at least one of: the temperature detected with the temperature sensor; a time elapsed after ignition of the engine; and a time elapsed after transition between the starting state and the normal state.

5. The charge air cooling system according to claim 3, wherein the controller is configured to manipulate the valve to form the passage to communicate the transmission device or the engine with the charge air cooler in the starting state or to manipulate the valve to form the passage to communicate the transmission device or the engine with the first radiator and to communicate the charge air cooler with the second radiator in the normal state, according to at least one of: a temperature detected with the temperature sensor; a time elapsed after ignition of the engine; and a time elapsed after transition between the starting state and the normal state.

6. The charge air cooling system according to claim 1, further comprising: in a normal state subsequent to the starting state, the charge air cooler is configured to receive the working fluid from the transmission device or the working fluid from the engine, and the first radiator is configured to receive the working fluid from the charge air cooler and to conduct heat exchange between the working fluid and air to cool the working fluid.

7. The charge air cooling system according to claim 6, further comprising:
    a valve, wherein
    the valve is configured to form a passage to communicate the transmission device or the engine with the charge air cooler in the starting state, and
    the valve is configured to form the passage to communicate the transmission device or the engine with the charge air cooler and the first radiator in the normal state.

8. The charge air cooling system according to claim 7, further comprising: a temperature sensor configured to detect a temperature of the working fluid, wherein the temperature sensor is configured to manipulate the valve to form the passage to communicate the transmission device or the engine with the charge air cooler in the starting state or to manipulate the valve to form the passage to communicate the transmission device or the engine with the charge air cooler and the first radiator in the normal state, according to the temperature detected with the temperature sensor.

9. The charge air cooling system according to claim 1, further comprising: a cooler located at an upstream of the charge air cooler or at a downstream of the charge air cooler to conduct heat exchange between the charge air, which flows through the interior of the shell, and the working fluid.

* * * * *